United States Patent
Jamison et al.

(10) Patent No.: US 8,517,103 B1
(45) Date of Patent: Aug. 27, 2013

(54) OIL OR GAS TREATMENT FLUID CONTAINING A CHELATE OR COORDINATION COMPLEX THAT SETS

(71) Applicant: Halliburton Energy Services, Inc., Houston, TX (US)

(72) Inventors: Dale E. Jamison, Houston, TX (US); Donald L. Whitfill, Houston, TX (US); Matthew L. Miller, Houston, TX (US); Kay A. Morris, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/693,259

(22) Filed: Dec. 4, 2012

(51) Int. Cl.
*E21B 43/27* (2006.01)
*E21B 33/13* (2006.01)

(52) U.S. Cl.
USPC .......... 166/300; 166/283; 166/305.1; 166/292

(58) Field of Classification Search
USPC .............. 166/305.1, 283, 300, 292–295
See application file for complete search history.

(56) References Cited

U.S. PATENT DOCUMENTS

| | | | |
|---|---|---|---|
| 4,362,510 A | 12/1982 | Brauer et al. | |
| 2011/0105369 A1* | 5/2011 | Reddy | 507/240 |

OTHER PUBLICATIONS

J. Russell Anderson et al., Physical Properties of Some Zinc Oxide-Eugenol Cements, Journal of Dental Research 1966, Mar.-Apr. 1966, pp. 379-387, vol. 45, No. 2, Ann Arbor, Michigan, US.

G.M. Brauer et al., Aluminum Oxide as a Reinforcing Agent for Zinc Oxide-Eugenol-o-Ethoxybenxoic Acid Cements, Journal of Dental Research 1968, Jul.-Aug. 1968, pp. 622-628, vol. 47, No. 4, Sage Publications, US.

* cited by examiner

*Primary Examiner* — Shane Bomar
*Assistant Examiner* — Catherine Loikith
(74) *Attorney, Agent, or Firm* — Craig W. Roddy; Sheri Higgins Law; Sheri Higgins

(57) ABSTRACT

A treatment fluid comprises: a metal oxide, wherein the metal oxide is capable of forming a chelate complex or coordination complex with a ligand, wherein the chelate complex or coordination complex has a setting time of less than 90 minutes at a temperature of 71° F. and a pressure of 1 atmosphere. A method of treating a portion of a subterranean formation comprises: introducing the treatment fluid into the subterranean formation; allowing or causing a chelate complex or coordination complex to form between the metal oxide and a ligand; and allowing or causing the chelate complex or coordination complex to set.

21 Claims, No Drawings

OIL OR GAS TREATMENT FLUID CONTAINING A CHELATE OR COORDINATION COMPLEX THAT SETS

TECHNICAL FIELD

A treatment fluid containing a metal oxide and methods of use are provided. The treatment fluid can further contain a ligand. The metal oxide and the ligand form a chelate complex or coordination complex. The chelate complex or coordination complex can set. The set chelate complex or coordination complex can be used in a variety of applications, such as for fluid-loss control, lost-circulation, or a thermal insulator.

SUMMARY

According to an embodiment, a treatment fluid comprises: a metal oxide, wherein the metal oxide is capable of forming a chelate complex or coordination complex with a ligand, wherein the chelate complex or coordination complex has a setting time of less than 90 minutes at a temperature of 71° F. and a pressure of 1 atmosphere.

According to another embodiment, a method of treating a portion of a subterranean formation comprises: introducing a treatment fluid into the subterranean formation, wherein the treatment fluid comprises a metal oxide; allowing or causing a chelate complex or coordination complex to form between the metal oxide and a ligand; and allowing or causing the chelate complex or coordination complex to set.

DETAILED DESCRIPTION

As used herein, the words "comprise," "have," "include," and all grammatical variations thereof are each intended to have an open, non-limiting meaning that does not exclude additional elements or steps.

It should also be understood that, as used herein, "first," "second," and "third," are assigned arbitrarily and are merely intended to differentiate between two or more chelate complex or coordination complexes, treatment fluids, etc., as the case may be, and does not indicate any sequence. Furthermore, it is to be understood that the mere use of the word "first" does not require that there be any "second," and the mere use of the word "second" does not require that there be any "third," etc.

As used herein, a "fluid" is a substance having an external phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A solution is an example of a homogenous fluid, containing a solvent (e.g., water) and a solute. A colloid is an example of a heterogeneous fluid. A colloid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase. There can be more than one internal phase of a colloid, but only one external phase. For example, there can be an external phase which is adjacent to a first internal phase, and the first internal phase can be adjacent to a second internal phase. Any of the phases of a colloid can contain dissolved materials and/or undissolved solids.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During wellbore operations, it is common to introduce a treatment fluid into a well. Examples of common treatment fluids include, but are not limited to, drilling fluids, spacer fluids, completion fluids, work-over fluids, production enhancement fluids, such as fracturing and acidizing fluids, and gravel-packing fluids. As used herein, a "treatment fluid" is a fluid designed and prepared to resolve a specific condition of a well or subterranean formation, such as for stimulation, zonal isolation, gravel packing, or fracturing. The term "treatment fluid" refers to the specific composition of the fluid as it is being introduced into a well. The word "treatment" in the term "treatment fluid" does not necessarily imply any particular action by the fluid.

A treatment fluid commonly includes one or more additives. Examples of additives commonly used include lost-circulation materials, isolation materials, drill cutting stabilization materials, thermal insulators, fracturing materials, fluid-loss control materials, and sacrificial wear materials.

A lost-circulation material (LCM) can also be included in a treatment fluid. LCMs are generally non-swellable, granular-shaped substances. As the treatment fluid is placed into the well, the LCM can eliminate or lessen the amount of fluid entering the formation. For example, the particles of the LCM can build upon each other and form a bridge over highly-permeable areas of the formation. The bridge can eliminate or reduce the amount of liquid entering the formation via the wellbore. However, it is not uncommon for an LCM to flow out of the desired location in the well. Therefore, there is a need for substance that can be used to bind LCMs together such that the LCMs remain in the desired location of the well.

Zonal isolation can be accomplished by a variety of mechanisms. Zonal isolation is the isolation of one zone of a subterranean formation from another zone. After isolation, treatments can be performed in the desired zone. One example of such a mechanism is the introduction of a cement composition into a portion of an annulus. The cement composition eventually sets and hardens and creates a non-permeable seal in the portion of the annulus. However, some problems arise with the use of a cement composition. First, when a water-based fluid is used, the cement of the cement composition can cause the fluid to thicken before it is desired. This can cause the fluid to become too viscous to pump into the well. Second, it is often difficult to remove a set cement composition after the cement is no longer needed for zonal isolation. Thus, there is a need for a substance that can be used in lieu of a cement composition in both water- and oil-based fluids that can also be removed after a desired time.

Yet another mechanism to achieve zonal isolation is the use of packers or bridge plugs. A packer or bridge plug can be inserted into the desired portion of a wellbore. The packer or bride plug can be mechanically activated or can be a swellable packer or bridge plug. The packer or bridge plug usually includes a component that can expand once positioned in the desired portion of the wellbore, wherein after expansion, the component creates a seal in the wellbore. However, a packer or bridge plug must generally be removed if zonal isolation is no longer desirable. There is a need for a substance that can be used in lieu of a packer or bridge plug that can be removed easier after a desired time.

A drill cutting additive can also be included in a treatment fluid. Drill cuttings are the pieces of material created during the drilling of a wellbore. The additive can help suspend the drill cuttings so the cuttings can be returned to the surface of the wellbore. It is often desirable to filter or remove drill cuttings from the drilling fluid in order to dispose of the cuttings and also so the drilling fluid can be re-used. However, often times the rheology of the fluid and the cuttings have a particle size such that their removal from the drilling fluid is difficult. Therefore, there is a need for a substance that can bind drill cuttings together and form a larger particle size enabling the cuttings to be removed easier from the drilling fluid and disposed of easier.

A thermal insulator can also be added to a treatment fluid. Thermal insulators function to decrease the thermal conductivity of the treatment fluid. In high-temperature subterranean formations, the decrease in thermal conductivity decreases the amount of heat that can be transferred to the wellbore from the formation or surrounding sea water via the fluid. In colder environments, such as off-shore drilling, the decrease in thermal conductivity decreases the amount of heat to the off-shore water from the wellbore via the fluid. However, there is a need for improved substances that have lower thermal conductivity to be used in a treatment fluid.

A fracturing fluid is one type of production enhancement fluid. Fracturing is performed by pumping a fracturing fluid at a pressure greater than the fracture pressure of the subterranean formation. The high pressure of the fluid creates a void in a portion of the formation, called a fracture. A fracture can be naturally occurring or can be created via the introduction of a fracturing fluid. Generally, after the pumping of the fracturing fluid is stopped, the fracture will tend to close. To prevent the fracture from closing, a material (commonly called proppant) or a frac plug is placed in the fracture to keep the fracture propped open. Proppant is usually in the form of an insoluble particulate, which is suspended in the fracturing fluid, carried downhole, and deposited in the fracture. Proppant generally has a particle size in the range of about 0.0625 millimeters (mm) to 2 mm. The proppant holds the fracture open while still allowing fluid flow through the permeability of the proppant pack. It is common for the proppant to flow out of the fracture and into the wellbore during production of oil, gas, or water. Therefore, there is a need for a substance that can bind the proppant pack together, while allowing the proppant to retain its permeability. A frac plug can also be used instead of proppant to keep a fracture open. However, frac plugs can often times be difficult to remove once in place. Thus, there is also a need for a substance that can be used as a frac plug that is easier to remove at a desired time.

An insoluble particulate also can be used for "gravel packing" operations. The insoluble particulate, when used for this purpose, is referred to as "gravel." More particularly in the oil and gas industry and as used herein, the term "gravel" is sometimes used to refer to relatively large insoluble particles in the sand size classification, that is, particles ranging in diameter from about 0.5 mm up to about 2 mm. There is also a need for a substance to help bind the gravel of a gravel pack together.

A fluid-loss control additive can be added to a treatment fluid to help prevent fluid loss into a subterranean formation. A fluid-loss control additive can be used to form a filtercake on the wall of a wellbore. A filtercake is the residue deposited on a permeable medium when a slurry, such as a drilling fluid, is forced against the medium under pressure. The filtrate is the liquid that passes through the medium, leaving the cake on the medium. In filtercake deposition, the slurry, that commonly includes water, a gelling agent, calcium carbonate particles, and polymers, is introduced into an open-hole wellbore portion. The fluid flows into a desired portion of the well. The ingredients in the fluid form the filtercake during subsequent completion operations. The filtercake can be used to bind fines, such as sand, together, can also reduce damage to formation permeability, and can also stabilize the wellbore. However, the filtercake may need to be removed in order to increase the interaction between cement and formation or it may be weak and unconsolidated. The removal of the filtercake can also cause damage to the formation during removal and thus, inhibit production of oil, gas, or water. There is a need for a substance that can bind calcium carbonate particles together in a desired location such that an improved filtercake is formed and also be removed without causing damage to the formation.

Sacrificial wear additives or their reaction products can form thin, tenacious films on wellbore parts to prevent metal-to-metal contact. These additives assist in the reduction of friction, wear, scuffing and scoring of wellbore parts. These additives can also be designed to erode or degrade after a certain time. There is a need for improved substances that can coat wellbore parts.

Thus, there is a need for fluid additives that exhibit improved properties and optionally meet environmental regulations. It has been discovered that an additive capable of forming a chelate complex or coordination complex containing one metal oxide and at least one polydentate or monodentate ligand can be used in a variety of treatment fluids. The chelate or coordination complex can set, which allows the additive to be used in a variety of treatment operations and exhibit improved properties compared to other additives used for the same operation.

A chelate complex exists when a single metal ion forms coordinate bonds with a polydentate ligand. A ligand is commonly called a chelant, chelating agent or sequestering agent. A coordination complex exists when a single metal ion forms coordinate bonds with a monodentate ligand. The ligand sequesters and inactivates the central metal ion so the metal ion does not easily react with other elements or ions to produce precipitates or scale. A polydentate ligand is a molecule or compound in which at least two atoms of the ligand bond with the metal ion. A polydentate ligand can be, for example, bidentate (2 atoms bond), tridentate (3 atoms bond), tetradentate (4 atoms bond), pentadentate (5 atoms bond), and so on. A monodentate ligand is a molecule or compound in which only one atom of the ligand bonds with the metal ion. The ligand can also contain at least one functional group that is capable of forming a bond with the chelant. Common functional groups include a carboxylate, an amine, an alcohol, and an ether.

One or more chelate or coordination complexes can be cross-linked with each other via a cross-linking agent. As used herein, a "cross-link" is a connection between two or more chelate or coordination complexes. Accordingly, the metal ion should contain at least 2 available charges for cross-linking with another atom of a different chelate or coordination complex.

According to an embodiment, a treatment fluid comprises: a metal oxide, wherein the metal oxide is capable of forming a chelate complex or coordination complex with a ligand, wherein the chelate complex or coordination complex has a setting time of less than 90 minutes at a temperature of 71° F. and a pressure of 1 atmosphere.

According to another embodiment, a method of treating a portion of a subterranean formation comprises: introducing a treatment fluid into the subterranean formation, wherein the treatment fluid comprises a metal oxide; allowing or causing a chelate complex or coordination complex to form between the metal oxide and a ligand; and allowing or causing the chelate complex or coordination complex to set.

The treatment fluids include a metal oxide. According to an embodiment, the metal oxide is capable of forming a chelate complex or coordination complex with a ligand. According to another embodiment, the metal oxide forms a chelate complex or coordination complex in the presence of a ligand. The metal of the metal oxide can be any metal that forms or is capable of forming the chelate complex or coordination complex in the presence of the ligand. According to an embodiment, the metal oxide has at least one available charge for creating a bond with an available charge of the ligand. According to another embodiment, the metal oxide has two or more available charges for creating bonds with two or more available charges of the ligand. The metal oxide can also contain an additional available charge for cross-linking with another chelate complex or coordination complex.

Examples of suitable metal oxides include, but are not limited to, the oxides of metals found in Groups IIA and IIB of the periodic table as well as tin oxide (Group IVB). As used herein, a "metal oxide" also includes hydroxides of the aforementioned metals. The metal oxide can also be a metal that reacts in the presence of water to form a metal hydroxide. Preferably, the metal oxide is the oxide or hydroxide of zinc, aluminum, calcium, tin, barium, or magnesium, with zinc being the most preferred. The treatment fluid can also contain more than one metal oxide, wherein the two or more metal oxides are the same or different. By way of example, a first metal oxide can be zinc oxide while a second metal oxide can be zinc hydroxide. By way of another example, a first metal oxide can be calcium oxide or hydroxide while a second metal oxide can be tin oxide or hydroxide.

The ligand can be any molecule or compound that forms or is capable of forming the chelate complex or coordination complex in the presence of the metal oxide. The ligand can be monodentate or polydentate. According to an embodiment, the ligand has one available charge for creating a bond with an available charge of the metal oxide. In this embodiment, the ligand is monodentate and will form a coordination complex with the metal oxide. According to another embodiment, the ligand has two or more available charges for creating bonds with two or more available charges of the metal oxide. In this embodiment, the ligand is polydentate and will form a chelate complex with the metal oxide. According to yet another embodiment, two or more ligands can bond with the metal oxide. Therefore, a first ligand and a second ligand can each have at least one available charge for bonding with the metal oxide. There can also be two or more chelate complexes, coordination complexes, or both chelate and coordination complexes formed. There can also be multiple ligands that bond or are capable of bonding with two or more metal oxides, wherein the two or more metal oxides can be the same or different and the ligands can be the same or different. This results in the formation of two or more chelate or coordination complexes.

The ligand can contain a functional group that has at least one available charge for bonding with the metal oxide. The functional group of the ligand can be selected from the group consisting of, a carboxylate, an amine, an alcohol, an ether, a phosphate, a thiol, a thiol ether, isocyanate, isothiocyanate, cyclopentadienide, elements, and combinations thereof. Examples of elements include, but are not limited to, phosphorus, sulphur, nitrogen, and oxygen. The ligand can be naturally-occurring or synthetic. An example of a naturally-occurring ligand is eugenol, a natural product found in many plants, such as cloves, nutmeg, cinnamon, basil, and bay leaves. A naturally-occurring ligand can be used in geographic areas having environmental regulations that require biodegradable, biocompatible, or naturally-occurring treatment fluid additives. The ligand can also be esters of vanillic acid (4-hydroxy-3-methoxybenzoic acid) or its isomers, for example, isovanillic acid (3-hydroxy-4-methoxybenzoic acid) or o-vanillic acid (2-hydroxy-3-methoxybenzoid acid), or homologs, for example, homovanillic acid, which are liquids at about 22° C. (or +/−30° C.).

There can also be more than one chelate complex or coordination complex formed. According to this embodiment, multiple metal oxides and multiple ligands can form two or more chelate complexes or coordination complexes. The metal oxides and ligands can be the same or different. Moreover, there can be one or more than one chelate complex formed and one or more than one coordination complex formed. Accordingly, the ligands can be monodentate, polydentate, or both. According to an embodiment, if there is more than one chelate complex and/or coordination complex formed, then the chelate complexes and/or coordination complexes can form a complex network. The complex network can be formed, for example, by cross-linking two or more chelate and/or coordination complexes. Without being limited by theory, this can occur, for example when a first available charge of the ligand bonds with a first metal oxide and a second available charge of the ligand bonds with a second metal oxide. Of course, more than one charge of the ligand can create a bond with the first metal oxide and more than one charge can create a bond with the second metal oxide. Also, an available charge of a first ligand of a first chelate complex or coordination complex can create a bond with an available charge of a second ligand of a second chelate complex or coordination complex. Moreover, another molecule or compound, such as a cross-linking agent, can also be used to cross-link two or more chelate or coordination complexes together via bonding with one or more available charges of a first and second ligand. Some or all of the chelate and/or coordination complexes can be cross-linked to form the complex network. Additionally, there can be two or more complex networks formed.

The treatment fluid contains the metal oxide. The treatment fluid can further comprise water. The water can be selected from the group consisting of freshwater, brackish water, salt water, and combinations thereof. The treatment fluid can also further comprise a hydrocarbon liquid. According to an embodiment, the ligand is soluble in the treatment fluid. As used herein, the term "soluble" means that at least one part of the substance dissolves in 20 parts of the liquid. According to an embodiment, the ligand is soluble in a hydrocarbon liquid, and slightly soluble or insoluble in water.

The ratio of metal oxide to ligand can vary and can range from about 0.1:99.9 to about 95:5 by weight.

According to an embodiment, the treatment fluid further comprises the ligand. According to another embodiment, a second treatment fluid comprises the ligand. The metal oxide can be in a concentration in the range of about 10% to about 98% by weight of the treatment fluid. The ligand can be in a concentration in the range of about 10% to about 95% percent by weight of the treatment fluid or second treatment fluid. If the treatment fluid contains both, the metal oxide and the ligand, then the concentration of the chelate complex or coordination complex formed can be in the range of about 0.01% to about 25% by weight of the treatment fluid.

According to an embodiment, the chelate complex or coordination complex sets or is capable of setting at a temperature of 71° F. (about 22° C.) and a pressure of 1 atmosphere. As used herein, the term "set," and all grammatical variations thereof, means the process of developing compressive strength and becoming hard or solid by curing. A chelate complex or coordination complex can be considered set when the complex reaches a compressive strength of at least 500 pounds force per square inch "psi" (3.4 megapascals "MPa") using a destructive compressive strength method. The destructive method mechanically tests the compressive strength of a substance. As used herein, the "compressive strength" of a substance is measured at ambient temperature (about 71° F., about 22° C.) as follows. The substance is mixed. The substance is then placed into a test cell for at least 24 hours at a temperature of 90° F. (32.2° C.) until the substance has set. The set substance is then removed from the test cell and the set substance is then placed into a compression-testing device, such as a Carver Press testing machine model 4350 L, available from Carver Inc. in Indiana, USA. The pressure is gradually increased until the substance breaks. The destructive compressive strength is calculated as the force required to break the substance divided by the smallest cross-sectional area in contact with the load-bearing plates of the compression-testing device. The destructive compressive strength is reported in units of pressure, such as pound-force per square inch (psi) or megapascals (MPa).

According to another embodiment, the chelate complex or coordination complex has a setting time of less than 90 minutes, preferably less than 60 minutes, more preferably less than 30 minutes, at a temperature of 71° F. (about 22° C.) and a pressure of 1 atmosphere. As used herein, the term "setting time," and all grammatical variations thereof, means the time it takes for the chelate complex or coordination complex to set after formation.

The chelate complex or coordination complex can also be malleable prior to setting. In this manner, the chelate complex or coordination complex can be positioned in the desired portion of the subterranean formation prior to setting. This can help to ensure that the chelate complex or coordination complex is properly positioned before setting, for example, positioned into a near-wellbore region of a subterranean formation, for example in a squeeze application.

The chelate complex or coordination complex can have a compressive strength of at least 500 psi (3.4 MPa), preferably at least 1,000 psi (6.9 MPa). The chelate complex or coordination complex can also have a compressive strength of at least 500 psi (3.4 MPa), preferably at least 1,000 psi (6.9 MPa), at the bottomhole temperature of the well. As used herein, the term "bottomhole" means the portion of the well to be treated.

According to another embodiment, the treatment fluid is in a pumpable state prior to and during introduction into the well.

The methods include the step of introducing the treatment fluid into the subterranean formation. The subterranean formation can be penetrated by a well, and the step of introducing can include introducing the treatment fluid into the well. The well can be, without limitation, an oil, gas, or water producing well, an injection well, a geothermal well, or an off-shore well. As discussed above, the ligand can be included in a second treatment fluid. The methods can further include the step of introducing the second treatment fluid into the subterranean formation, wherein the step of introducing the second treatment fluid can be performed prior to or after the step of introducing the first treatment fluid. The step(s) of introducing can include pumping the treatment fluid into the subterranean formation or into the well. There can also be more than one treatment fluid and more than one second treatment fluid introduced into the subterranean formation or well. This sequence of serially introducing the treatment fluid and second treatment fluid can be referred to as a train. Another fluid, such as a spacer fluid can also be introduced between the treatment fluid and second treatment fluid. The train can involve the introduction of multiple fluids, according to for example, the following sequence: treatment fluid; spacer fluid; second treatment fluid; spacer; and so on. For a squeeze application, the methods can further include the step of applying a pressure to the treatment fluid(s) after the step of introducing the treatment fluid. The fluid(s) can then be "squeezed" into the near-wellbore region of the subterranean formation.

The methods include the step of allowing or causing the chelate complex or coordination complex to form between the metal oxide and the ligand. The step of causing can include introducing the second treatment fluid into the subterranean formation, wherein the second treatment fluid includes the ligand and the treatment fluid includes the metal oxide.

The methods also include the step of allowing or causing the chelate complex or coordination complex to set. The methods can further include the step of allowing or causing a complex network to form. According to an embodiment, the methods further include the step of introducing a cross-linking agent into the well, wherein the cross-linking agent comes in contact with the two or more chelate complexes, coordination complexes, or both chelate complexes and coordination complexes, and wherein the cross-linking agent forms the complex network. The complex network can also be formed, as discussed above, via the formation of bonds between the ligands of two or more chelate and/or coordination complexes. According to an embodiment, the complex network is capable of setting and the methods further include the step of allowing or causing the complex network to set.

The chelate complex or coordination complex can be, without limitation, a lost-circulation material, a binder for a lost-circulation material, a zonal isolation material, a binder for drill cuttings, a thermal insulator, a binder for a thermal insulator, a binder for proppant or gravel, a frac plug, a fluid-loss control material, a binder for a fluid-loss control material, or a sacrificial wear material. It is to be understood that more than one chelate or coordination complex, as well as a complex network, can function as any of the aforementioned materials. Moreover, one or more chelate or coordination complex, as well as a complex network, can function as a first material and one or more chelate or coordination complex, as well as a complex network, can function as a second material, wherein the one or more chelate or coordination complex, as well as a complex network, can be the same or different. Of course the one or more chelate or coordination complex, as well as a complex network, can function as multiple materials within portions of the well. It is also to be understood that the discussion below regarding the chelate complex or coordination complex as a material is intended to apply to one or more chelate or coordination complex, as well as a complex network, without the need to continually refer to all embodiments. Therefore, if the discussion involves "the chelate complex or coordination complex," then the discussion includes one or more chelate or coordination complex, as well as a complex network.

According to an embodiment, the treatment fluid can be a fluid for treating lost circulation. The chelate complex or coordination complex can be a lost-circulation material. According to a first embodiment, after introduction into the well, the chelate complex or coordination complex can set. The set complex can be in the form of particles. The particles can bridge on one another across a highly-permeable area of an open-hole wellbore portion and help prevent liquid portions of the treatment fluid from entering the subterranean formation. According to a second embodiment, the chelate complex or coordination complex can bind particles of a lost-circulation material (LCM) together. The LCM can be included in the treatment fluid. The methods can further include the step of introducing a lost-circulation material (LCM) into the well, wherein the step of introducing the LCM is performed prior to or after the step of introducing the treatment fluid. The methods can further include the step of causing or allowing the metal oxide, and also possibly the ligand, to come in contact with the LCM. At least the metal oxide can partially or fully coat the LCM. The ligand can then be introduced into the well, wherein the ligand comes in contact with the LCM partially or fully coated by the metal oxide. The chelate complex or coordination complex can then be formed and the chelate complex or coordination complex can then set. If both, the metal oxide and the ligand partially or fully coat the LCM (for example, when both are included in the treatment fluid), then the chelate complex or coordination complex can be formed and then set. Moreover, the chelate complex or coordination complex can form in the treatment fluid and the complex can coat the LCM before the complex sets. The set chelate complex or coordination complex can bind two or more, and preferably multiple, LCM particles together. This binding can improve the efficiency of the LCM and reduce the amount of liquid lost into the subterranean formation. It is to be understood that this discussion wherein the chelate complex or coordination complex binds the LCM particles applies to all embodiments where the chelate complex or coordination complex is used as a binder to bind other particles that are subsequently discussed.

According to another embodiment, the chelate complex or coordination complex can be a zonal isolation material. The chelate complex or coordination complex can isolate a first zone of a subterranean formation from a second zone after setting. The chelate complex or coordination complex can also be used to isolate multiple zones of a formation. The chelate complex or coordination complex can be used in lieu of a cement composition and/or a packer to achieve zonal isolation of a formation. This embodiment can be useful if the treatment fluid is an oil-based fluid because the chelate complex or coordination complex is capable of setting in the presence of the hydrocarbon liquid portion of the fluid.

According to another embodiment, the treatment fluid can be a drilling fluid. The chelate complex or coordination complex can be a binder for drill cuttings. The metal oxide and possibly the ligand can coat the drill cuttings. As discussed above, the chelate complex or coordination complex can set in order to bind the drill cuttings. The methods can further include the step of returning the drilling fluid containing the bound drill cuttings to the surface, wherein the step of returning can be performed after the step of allowing or causing the chelate complex or coordination complex to set. The methods can further include the step of removing the bound drill cuttings, unbound drill cuttings, and/or any set chelate complex or coordination complex that did not coat the drill cuttings from the drilling fluid, wherein the step of removing can be performed after the step of returning the drilling fluid to the surface.

According to another embodiment, the chelate complex or coordination complex can be a thermal insulator. When used as a thermal insulator, the chelate complex or coordination complex can set in a desired portion of the well. The set chelate complex or coordination complex can lower the thermal conductivity of the treatment fluid or wellbore components. In this manner, less heat is transferred from or to the wellbore. The chelate complex or coordination complex can also be a binder for a thermal insulator. As discussed above, the chelate complex or coordination complex can partially or fully coat thermal insulator particles. By binding the thermal insulator particles together helps to ensure that the thermal insulator particles remain in the desired location of the well.

According to another embodiment, the treatment fluid can be a fracturing fluid or a gravel pack fluid. The chelate complex or coordination complex can be a binder for proppant. The treatment fluid can further comprise proppant or gravel. The methods can further include the step of creating one or more fractures, wherein the step of introducing the treatment fluid creates the one or more fractures. The chelate complex or coordination complex can also be a frac plug. According to this embodiment, the chelate complex or coordination complex can partially or fully fill one or more fractures. In this manner, proppant may not be required in order to keep the fracture propped open. The set chelate complex or coordination complex can help maintain the fracture in an open position. According to these embodiments, preferably, the set chelate complex or coordination complex has a permeability of at least 0.1 millidarcy "mD". In this manner, when used in a fracturing fluid or gravel pack fluid, the permeability of the set chelate complex or coordination complex allows fluid flow through the set complex.

According to another embodiment, the chelate complex or coordination complex is a fluid-loss control material. According to this embodiment, preferably the treatment fluid containing the metal oxide is introduced into the well, and a second treatment fluid containing the ligand is subsequently introduced into the well. As such, the metal oxide can coat at least a portion of the wall of the wellbore and possibly part of the near-wellbore region. The ligand can then contact the metal oxide in order to form the chelate complex or coordination complex on the wall of the wellbore and/or near-wellbore region. The chelate complex or coordination complex can then set forming a type of filtercake on the wall of the wellbore and/or near-wellbore region. In this manner, fluid is restricted or prevented from flowing out of the wellbore and into the subterranean formation. The chelate complex or coordination complex can also be a binder for a fluid-loss control material. According to this embodiment, sized particles of a fluid-loss control material, for example calcium carbonate, can be introduced into the well. The set chelate complex or coordination complex can bind the sized particles together, as discussed above. The bound particles can then more effectively remain in the well. Furthermore, a lost-circulation material can then be introduced into the well, wherein the LCM can contact the filtercake and form bridges of LCM in order to help further reduce the amount of fluid lost into the formation.

According to another embodiment, the chelate complex or coordination complex can be a sacrificial wear material. According to this embodiment, the chelate complex or coordination complex can partially or fully coat a portion of a wellbore component, such as a tubing string, prior to setting. Preferably, the wellbore component comprises a metal. The metal oxide can coat the wellbore component and then the ligand can contact the metal oxide to form the chelate complex or coordination complex, or the chelate complex or coordination complex can coat the wellbore component prior to setting. The set chelate complex or coordination complex can then protect the wellbore component from detrimental environmental conditions, such as a corrosive fluid.

The methods can further include the step of breaking the chelate complex or coordination complex, wherein the step of breaking is performed after the step of allowing or causing the chelate complex or coordination complex to set. This may be useful, for example, if the chelate complex or coordination complex is no longer needed for its intended function (e.g., as a fluid-loss control material or sacrificial wear material). The step of breaking the set chelate complex or coordination complex can include introducing a substance into the subterranean formation, wherein the substance breaks or is capable of breaking one or more bonds between the metal oxide and the ligand. According to an embodiment, the substance breaks or is capable of breaking a sufficient number of bonds such that the chelate complex or coordination complex is dissociated into smaller particles or ions. The methods can further include the step of removing the treatment fluid, including the dissociated chelate complex or coordination complex, from the subterranean formation.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b,") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a portion of a subterranean formation comprising:
   introducing a treatment fluid into the subterranean formation, wherein the treatment fluid comprises a metal oxide;
   allowing or causing a chelate complex or coordination complex to form between the metal oxide and a ligand; and
   allowing or causing the chelate or coordination complex to set.

2. The method of claim 1, wherein the metal oxide forms a chelate complex or coordination complex in the presence of the ligand.

3. The method of claim 1, wherein the metal oxide is the oxide or hydroxide of zinc, aluminum, calcium, tin, barium, or magnesium.

4. The method of claim 1, wherein the treatment fluid further comprises two or more metal oxides, wherein the two or more metal oxides are the same or different.

5. The method of claim 1, wherein the ligand has one available charge for creating a bond with an available charge of the metal oxide.

6. The method of claim 5, wherein the ligand is monodentate and forms a coordination complex with the metal oxide.

7. The method of claim 1, wherein the ligand has two or more available charges for creating bonds with two or more available charges of the metal oxide.

8. The method of claim 7, wherein the ligand is polydentate and forms a chelate complex with the metal oxide.

9. The method of claim 1, wherein the ligand comprises a functional group that has at least one available charge for bonding with the metal oxide.

10. The method of claim 9, wherein the functional group is selected from the group consisting of, a carboxylate, an amine, an alcohol, an ether, a phosphate, a thiol, a thiol ether, isocyanate, isothiocyanate, cyclopentadienide, elements, and combinations thereof.

11. The method of claim 1, wherein the ligand is naturally-occurring.

12. The method of claim 11, wherein the ligand is eugenol.

13. The method of claim 1, wherein the treatment fluid further comprises the ligand.

14. The method of claim 1, wherein the step of causing the chelate or coordination complex to form comprises introducing a second treatment fluid into the well, wherein the second treatment fluid includes the ligand.

15. The method of claim 1, wherein the chelate complex or coordination complex is malleable prior to setting.

16. The method of claim 1, further comprising allowing or causing two or more chelate complexes, coordination complexes, or both chelate complexes and coordination complexes to form between two or more metal oxides and two or more ligands.

17. The method of claim 16, wherein a complex network is formed between the two or more chelate complexes, coordination complexes, or both chelate complexes and coordination complexes.

18. The method of claim 17, wherein the complex network is formed by cross-linking the two or more chelate complexes, coordination complexes, or both chelate complexes and coordination complexes.

19. The method of claim 18, further comprising the step of introducing a cross-linking agent into the well, wherein the cross-linking agent comes in contact with the two or more chelate complexes, coordination complexes, or both chelate complexes and coordination complexes, and wherein the cross-linking agent forms the complex network.

20. The method of claim 1, wherein the chelate complex or coordination complex is a lost-circulation material, a binder for a lost-circulation material, a zonal isolation material, a binder for drill cuttings, a thermal insulator, a binder for a thermal insulator, a binder for proppant or gravel, a frac plug, a fluid-loss control material, a binder for a fluid-loss control material, or a sacrificial wear material.

21. The method of claim 1, further comprising the step of breaking the chelate complex or coordination complex, wherein the step of breaking is performed after the step of allowing or causing the chelate complex or coordination complex to set.

* * * * *